United States Patent Office 3,252,988
Patented May 24, 1966

3,252,988
THIAZOLIDINETRIONES
Paul J. Stoffel, St. Louis, Mo., assignor to Monsanto Company, a corporation of Delaware
No Drawing. Filed Sept. 23, 1963, Ser. No. 310,883
18 Claims. (Cl. 260—306.7)

This invention relates to a novel chemical process and to new compounds prepared thereby. The new compounds are biological toxicants useful as herbicides and in the control of objectionable microorganisms. The compounds are also useful intermediates in the preparation of other biologically active compounds.

The new procedure may be defined structurally by the equation:

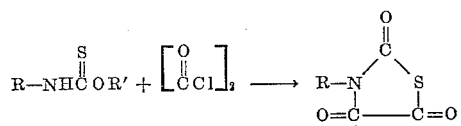

in which R and R' are selected from the class consisting of hydrocarbon radicals selected from the class consisting of alkyl radicals of up to 12 carbon atoms, alkenyl radicals of up to 12 carbon atoms, cycloalkyl having from four to eight carbon atoms, phenyl and benzyl; and the said hydrocarbon radicals containing up to four substituents selected from the group consisting of chlorine, bromine, nitro, alkyl having up to four carbon atoms, alkoxy having up to four carbon atoms and phenyl.

This reaction is effected by combining the reagents to produce an exothermic reaction. The rearrangement of the thiono sulfur atom to form a thiazolidinetrione may be accomplished at moderate temperatures, for example 30 to 80° C. generated as the heat of reaction. If desired to complete the reaction, additional heating may be used, for example from 80 to 180° C. Further heating is undesirable because it will frequently induce decomposition of the product.

To control the rate of reaction, the reaction mixture may be diluted with a suitable inert solvent, for example the aromatic hydrocarbons and halogen substituted hydrocarbons, such as benzene, chlorobenzene, toluene, chlorotoluene, xylene, 1,4-dichlorobenzene, etc.

The reaction may be efficiently controlled by dissolving one reagent in the solvent medium and gradually adding thereto the second reagent.

The reaction between oxalyl chloride and the esters of the thionocarbamic acids are continued until substantial completion as evidenced by the subsidence of the reaction temperature. The product may be separated from the solvent medium by adding to the solvent a miscible solvent which is a non-solvent for the product. This will reduce the solubility of the product in the reaction mixture and induce the precipitation of the product. The crude product may then be purified by recrystallization from a suitable solvent, for example acetone or ether.

Further details of the preparations and the products so formed are set forth in the following specific examples.

Example 1

A reaction flask was charged with 50 ml. of toluene and 26.4 grams of isopropyl-3,4-dichlorothionocarbanilate. The reaction was effected by the gradual addition of 12.7 grams of oxalyl chloride. The reaction was exothermic. Throughout the reaction HCl was evolved and when the reaction subsided the mixture was stirred for one hour. With continued stirring 250 ml. of hexane was added and the product precipitated in the form of white crystals (M.P. 179.9–180.5° C.). The compound was found to have the structure:

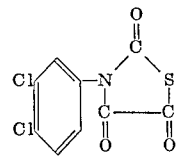

Example 2

The preceding procedure was repeated using methyl N-methylthionocarbamate in place of the isopropyl 3,4-dichlorothionocarbanilate. A product identified as that having the following structure was formed.

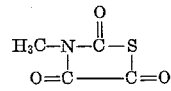

Example 3

The reaction product of oxalyl chloride and benzyl N-4-ethoxythionocarbanilate was identified as that having the structure:

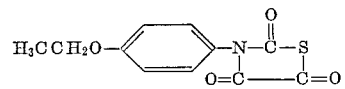

Example 4

The procedure of Example 1 was repeated using methyl cyclohexylthionocarbamate in place of isopropyl 3,4-dichlorothionocarbanilate. The resulting structure was found to characterize the product:

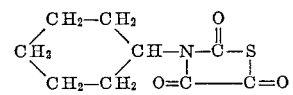

Example 5

A xylene solution of allyl N-allylthionocarbamate was treated with a slight excess of oxalyl chloride. When the reaction temperature subsided an equal volume of hexane was added. The product precipitated was identified as having the structure:

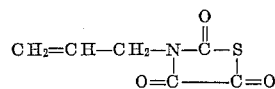

Example 6

Using the procedure of Example 1 except the flask was charged with a stoichiometric proportion of ethyl 3,4-dichlorothionocarbanilate. The addition of oxalyl chloride formed a product identical to that of Example 1 with the structure:

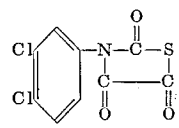

Example 7

The reaction of equimolar proportions of oxalyl chloride and phenyl N-4-methyloxybenzylthionocarbamate produced a compound of the structure:

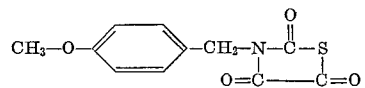

Example 8

Using the procedural details of Example 1 oxalyl chloride and methyl thionocarbanilate were reacted to form a compound of the structure:

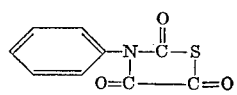

Example 9

The procedure of Example 8 was repeated substituting methyl methoxythionocarbanilate for the methyl thionocarbanilate. The following compound was formed:

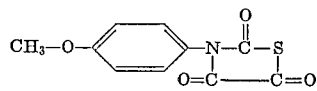

Examples 10 to 12

Using the procedures of Examples 1 to 9 and selected thiocarbanilates, compounds of the following formulae can be prepared:

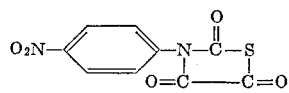

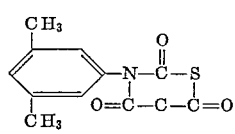

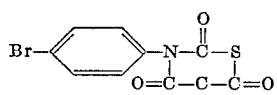

Examples 13 to 16

Useful compounds may also be prepared by reacting the following thionocarbanilate esters with oxalyl chloride by the procedures described in Examples 1 to 9:

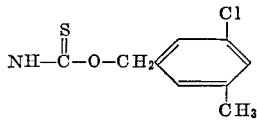

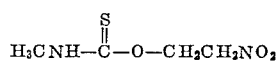

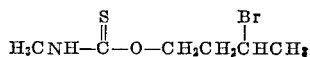

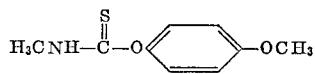

Although the invention is described with respect to specific modifications, it is not intended that the details thereof are limitations on the scope of the invention except to the extent incorporated in the following claims.

What is claimed is:

1. A compound of the formula:

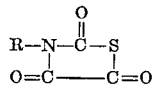

wherein R is selected from the class consisting of hydrocarbon selected from the class consisting of alkyl of up to 12 carbon atoms, alkenyl of up to 12 carbon atoms, cycloalkyl having from 4 to 8 carbon atoms, phenyl and benzyl; and said hydrocarbon containing up to four substituents selected from the group consisting of chlorine, bromine, nitro, alkyl of up to four carbon atoms, alkoxy having up to four carbon atoms and phenyl.

2. The method of preparing thiazolidinetriones which comprises heating oxalyl chloride with esters of thionocarbamic acid having the formula:

wherein both R and R' are selected from the class consisting of hydrogen; hydrocarbon selected from the class consisting of alkyl of up to 12 carbon atoms, alkenyl of up to 12 carbon atoms, cycloalkyl having from 4 to 8 carbon atoms, phenyl and benzyl; and said hydrocarbon containing substituents selected from the group consisting of chlorine, bromine, nitro, alkyl of up to four carbon atoms, alkoxy having up to four carbon atoms and phenyl.

3. A compound of the formula:

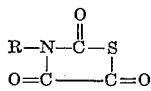

wherein R is an alkyl having up to 12 carbon atoms.

4. The method of preparing thiazolidinetriones which comprises heating at reflux temperatures in an inert solvent medium oxalyl chloride and a thionocarbamic acid ester of the formula:

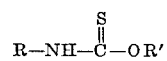

wherein both R and R' are alkyl of up to 12 carbon atoms.

5. A compound of the formula:

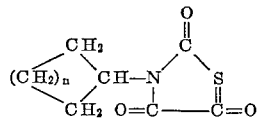

wherein $n$ is an integer from one to five.

6. The method of preparing thiazolidinetriones which comprises heating at reflux temperatures in an inert solvent medium oxalyl chloride and an alkyl N-cycloalkyl thionocarbamate, wherein the alkyl has up to 12 carbon atoms and the cycloalkyl radical has from four to eight carbon atoms.

7. A compound of the formula:

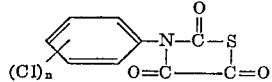

wherein $n$ is an integer from one to four.

8. The method of preparing compounds of the formula:

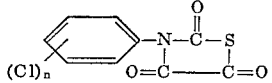

which comprises heating at the reflux temperature in an inert solvent medium oxalyl chloride and an alkyl thionocarbamate of the formula:

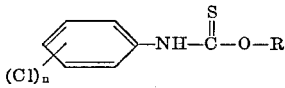

wherein R is alkyl of up to 12 carbon atoms and $n$ is an integer from one to four.

9. N-methyl thiazolidinetrione.

10. The method of preparing N-methyl thiazolidinetrione which comprises heating in an aromatic hydrocarbon medium oxalyl chloride and methyl N-methylthionocarbamate.

11. N-cyclohexyl thiazolidinetrione.

12. The method of preparing N-cyclohexyl thiazolidinetrione which comprises heating in an aromatic hydrocarbon medium oxalyl chloride and ethyl N-cyclohexylthionocarbamate.

13. N-3,4-dichlorophenyl thiazolidinetrione.

14. The method of preparing N-3,4-dichlorophenyl thiazolidinetrione which comprises heating in an aromatic hydrocarbon medium oxalyl chloride and methyl 3,4-dichlorothionocarbanilate.

15. N-4-methoxyphenyl thiazolidinetrione.

16. The method of preparing N-4-methoxyphenyl thiazolidinetrione which comprises heating in an aromatic hydrocarbon medium oxalyl chloride and methyl 4-ethoxythionocarbanilate.

17. N-phenyl thiazolidinetrione.

18. The method of preparing N-phenyl thiazolidinetrione which comprises heating in an aromatic hydrocarbon medium oxalyl chloride and methylthionocarbanilate.

References Cited by the Examiner

Burger: Medicinal Chemistry (New York, 1960), pages 77–81.

NICHOLAS S. RIZZO, *Primary Examiner.*

ALTON D. ROLLINS, *Assistant Examiner.*